United States Patent
Pi et al.

(10) Patent No.: US 12,299,703 B1
(45) Date of Patent: May 13, 2025

(54) SYSTEMS AND METHODS FOR TRENDING PRODUCT RECOMMENDATIONS

(71) Applicant: Amazon Technologies, Inc., Seattle, WA (US)

(72) Inventors: Xidong Pi, Stony Brook, NY (US); Shaunak Mishra, Jersey City, NJ (US); Ravendar Lal, Bellevue, WA (US); Anirban Sengupta, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 174 days.

(21) Appl. No.: 18/066,834

(22) Filed: Dec. 15, 2022

(51) Int. Cl.
*G06Q 30/00* (2023.01)
*G06F 40/00* (2020.01)
*G06F 40/289* (2020.01)
*G06Q 30/0201* (2023.01)
*G06Q 30/0601* (2023.01)

(52) U.S. Cl.
CPC ....... *G06Q 30/0201* (2013.01); *G06F 40/289* (2020.01); *G06Q 30/0631* (2013.01)

(58) Field of Classification Search
CPC .................................................. G06Q 30/0631
See application file for complete search history.

(56) References Cited

U.S. PATENT DOCUMENTS

| | | | |
|---|---|---|---|
| 10,776,854 B2 * | 9/2020 | Noguchi | G06Q 30/06 |
| 2020/0401976 A1 * | 12/2020 | Nelson | G06Q 30/0282 |
| 2022/0358172 A1 * | 11/2022 | Simhadri | G06F 16/9574 |
| 2023/0260249 A1 * | 8/2023 | Dunay | G06V 10/761 |

OTHER PUBLICATIONS

Y. S. Cho, K. H. Ryu, K. S. Ryu and S. C. Moon, "Personalized u-commerce recommending service using weighted sequential pattern with time-series and FRAT method," 2014 IEEE International Conference on Management of Innovation and Technology, Singapore, 2014, pp. 295-300 (Year: 2014).*

* cited by examiner

*Primary Examiner* — Matheus Ribeiro Stivaletti
(74) *Attorney, Agent, or Firm* — Eversheds Sutherland (US) LLP

(57) ABSTRACT

Systems and methods for trending product recommendations are provided herein. Particularly, click-through-rate (CTR) and conversion-rate (CVR) data metrics associated with various products may be analyzed to identify trending products. Keyphrases may then be extracted from information associated with these trending products and provided to an unsupervised graph-based model to determine a relative importance of each keyphrase relative to other keyphrases extracted from information associated with other trending products. Keyphrases that are determined to be the most "important" may then be presented along with the trending products in a trending product widget when a user searches for products.

20 Claims, 8 Drawing Sheets

SYSTEMS AND METHODS FOR TRENDING PRODUCT RECOMMENDATIONS

BACKGROUND

Certain online retail shopping platforms may allow users to browse for various types of items included in a virtual catalog of the online retail shopping platforms. The users may also be able to view specific product information and/or make product purchases. However, oftentimes users are interested in viewing trending products within a certain category of products and these online retail shopping platforms may not necessarily provide an indication of such trending products and the reasons the products are trending.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 5 illustrates an example user interface including trending products, in accordance with one or more example embodiments of the disclosure.

DETAILED DESCRIPTION

Figure 1:
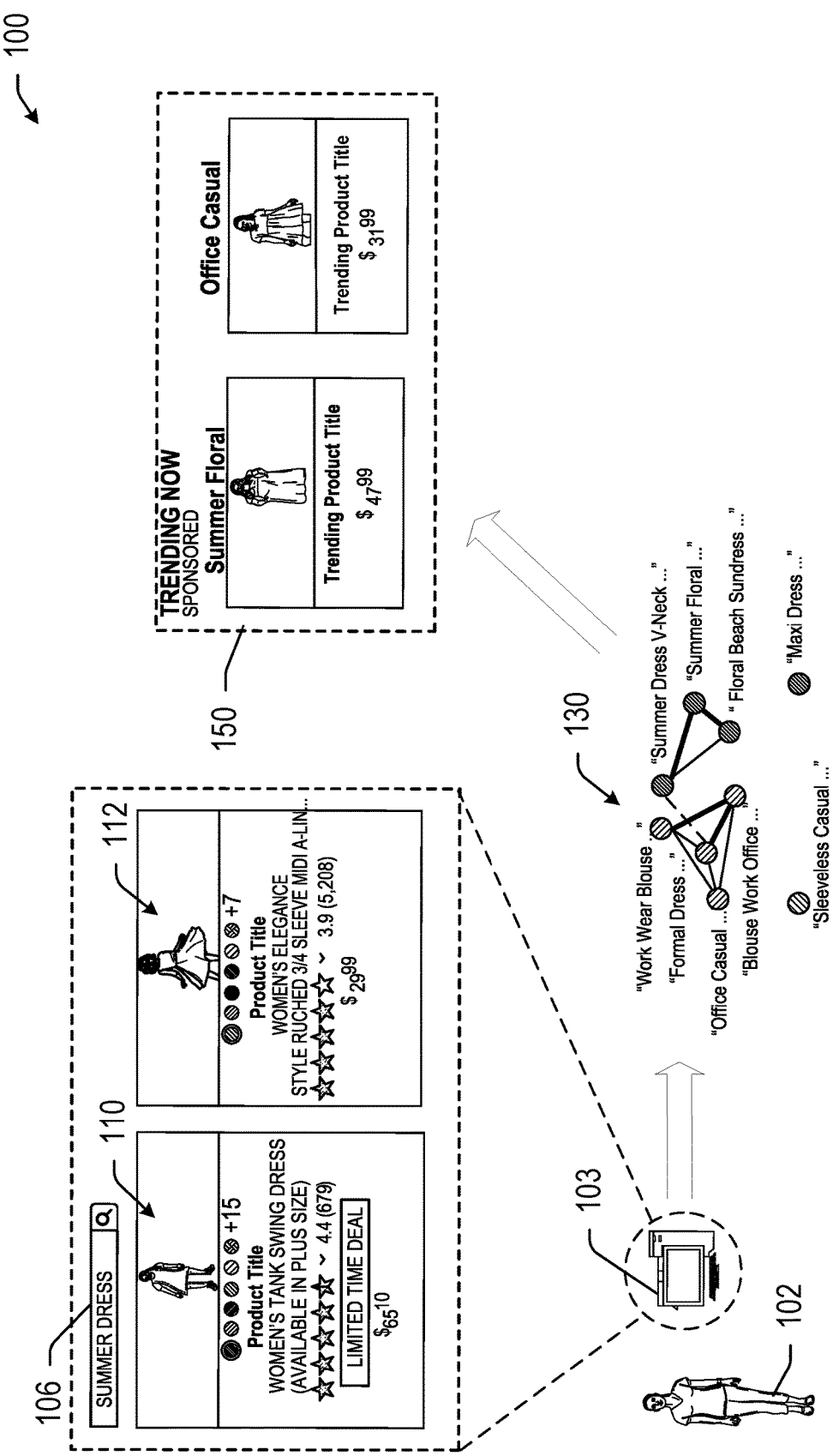
FIG. 1 illustrates an example use case for presentation of a trending products widget, in accordance with one or more example embodiments of the disclosure.

This disclosure relates to, among other things, devices, systems, methods, computer-readable media, techniques, and methodologies for trending product recommendations. Particularly, the methods described herein may involve at least two facets: (1) trend detection and (2) trend interpretation. Trend detection involves identifying the products that are trending. The products, for example, may be associated with an online shopping retail platform, however, this is not intended to be limiting and these systems and methods may be applicable in any other context as well. Once the product trends are identified, trend interpretation may then be performed to determine specific reasons that the product trends are occurring. Finally, indications of the trending products along with additional information produced by the trend interpretation may be presented to users through a user interface to improve the online shopping experience of these users.

"Trending products" may generally refer to products that experience a drastic increase in their popularity due to a variety of factors. For example, during summer months, dresses with new designs for summer (e.g., floral prints) may organically appeal to a large audience, and hence experience a spike in popularity. A significant fraction of shoppers diligently follow these trends (e.g., via social media), and this behavior may reflect in their purchases. However, on search pages associated with some online retail shopping platforms, products may often be ranked without a full consideration of current trends or popularity in a recent time range. Current search results based on number of sales and ratings for all time (e.g., query-relevant best-sellers showing up at the top) may not reflect the fast-changing dynamics of product trends, particularly in categories such as fashion and beauty. This makes it difficult for shoppers to discover trending products on the search page.

As described in further detail herein, trend detection may be performed by analyzing various metrics associated with products included in an online catalogue associated with the online retail shopping platform. Specifically, the methods described herein may leverage click-through-rate (CTR) and conversion-rate (CVR) data in a moving time window. These metrics may be used because, regardless of the external factors causing the rise in a trending product's popularity, the product may often experience an increase in shopper engagement (e.g., CTR and CVR). Using these metrics, spikes in popularity associated with various products may be detected.

Trend interpretation may leverage an unsupervised graph-based model (for example, a natural language processing (NLP) model) to identify dominant keyphrases associated with product titles and/or other product information. This approach may be based on the notion that certain phrases in product titles may be common across several trending products (e.g., summer floral), and hence, keyphrase extraction from titles of trending products can serve as intuitive hints around why certain products are trending. Process flows illustrating specific operations associated with trend detection and trend interpretation, as well as further implementation details, are provided in at least FIGS. 2-4. NLP may be used to identify keyphrases for products used in the product pages, including from product names/titles, product descriptions, and user reviews of the products, any of which may be presented on a product's page. From the keyphrases, a document may be generated to list the keyphrases with the corresponding unique product identifiers for any products (e.g., the trending products). The graph-based model may be used to identify the dominant keyphrases and the products using the dominant keyphrases, which may be presented in a trending products portion (e.g., widget) of a user interface of an online retail system.

Referring to FIG. 1, an example use case 100 illustrating presentation of a trending products widget is depicted, in accordance with one or more example embodiments of the disclosure. The use case 100 illustrates a high-level example of a manner in which a trending product widget 150 may be generated and presented to one or more users of an online retail shopping platform (or within any other context). It should be noted that this use case 100 is not intended to illustrate all of the steps involved in trend detection and interpretation (more specific implementation details about provided in at least the process flows of FIGS. 2-4), but is merely intended to provide a depiction of some of the general steps involved.

The use case 100 begins with one or more users (for example, a first user 102) performing search queries within the online retail shopping platform. The first user 102 is shown as having input a first search query 106 for a "summer dress." The search queries may be input, for example, using one or more devices (such as device 103 and/or other devices, which may be the same as user device 602 of FIG. 6 or any other device described herein or otherwise). FIG. 1 shows the device 103 as being a desktop computer, however, this is not intended to be limiting.

Based on the respective search queries, the online retail shopping platform presents various search results containing products related to the search queries that are included within a virtual catalog of the online retail shopping platform. For example, a first product 110 and second product 112 are presented to the first user 102 based on the first search query 106. Any other number of search results may also be presented as well.

Any of the products presented based on the first search query 106 may be associated with various types of information, such as product titles, product descriptions, product reviews, etc. Additionally, either of the users may select one of the products presented in the search results and the online retail shopping platform may navigate to a product-specific page for the selected product. The action of selecting the specific product to navigate to the product-specific page may be recorded as one CTR for the particular product as mentioned above. Additionally, the user may have the option to add the specific product to a virtual shopping cart of the online retail shopping platform and/or purchase the product. A purchase of a product may be recorded as one CVR for the particular product as mentioned above. Thus, as multiple users select and/or purchase a particular product, the CTR and CVR values associated with the product may increment and increase in value. The CTR and CVR values may periodically be reset back to zero such that these metrics that are used to identify trending products (as described below) provide indications of recent product trends within a given time frame.

Figure 2:
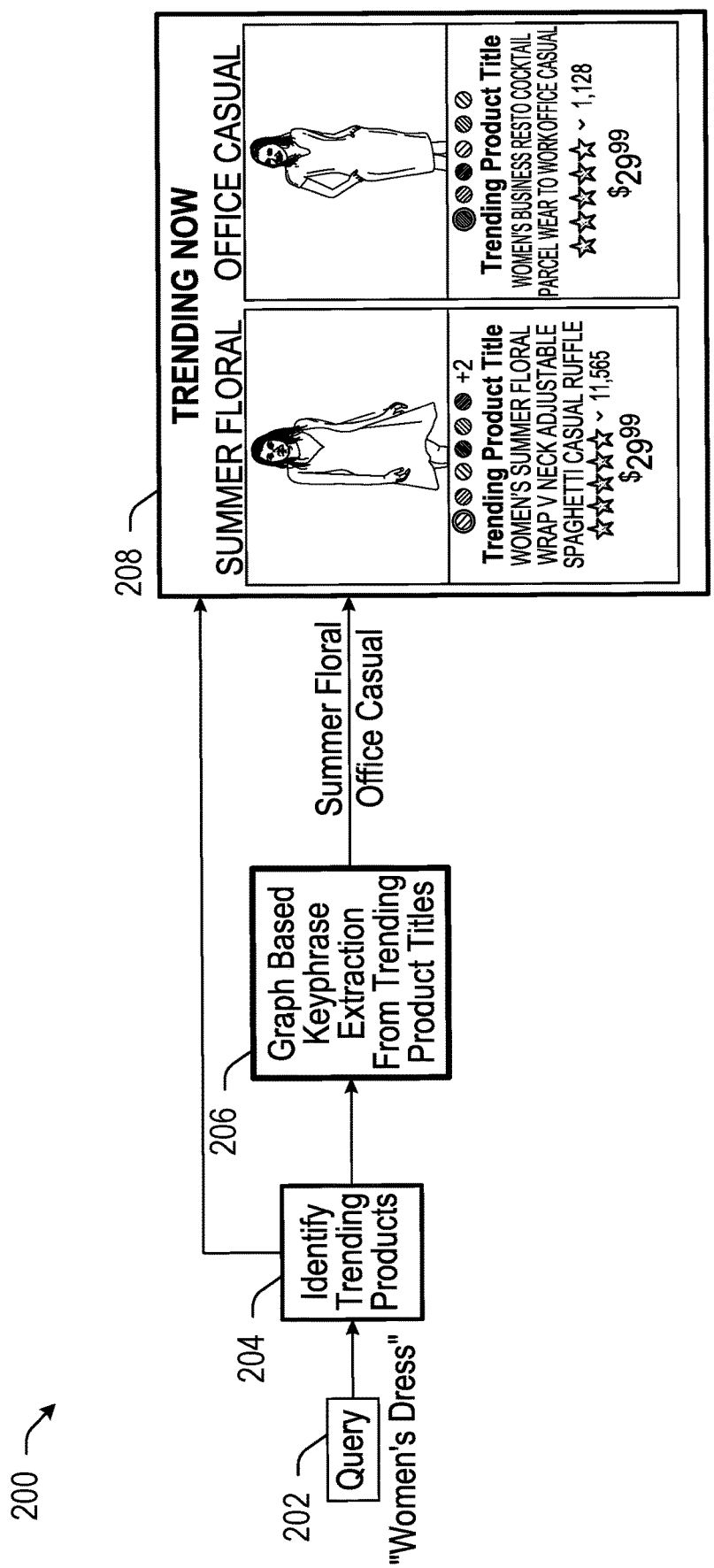
FIG. 2 illustrates an example process flow for trend detection and trend interpretation, in accordance with one or more example embodiments of the disclosure.
Figure 3:
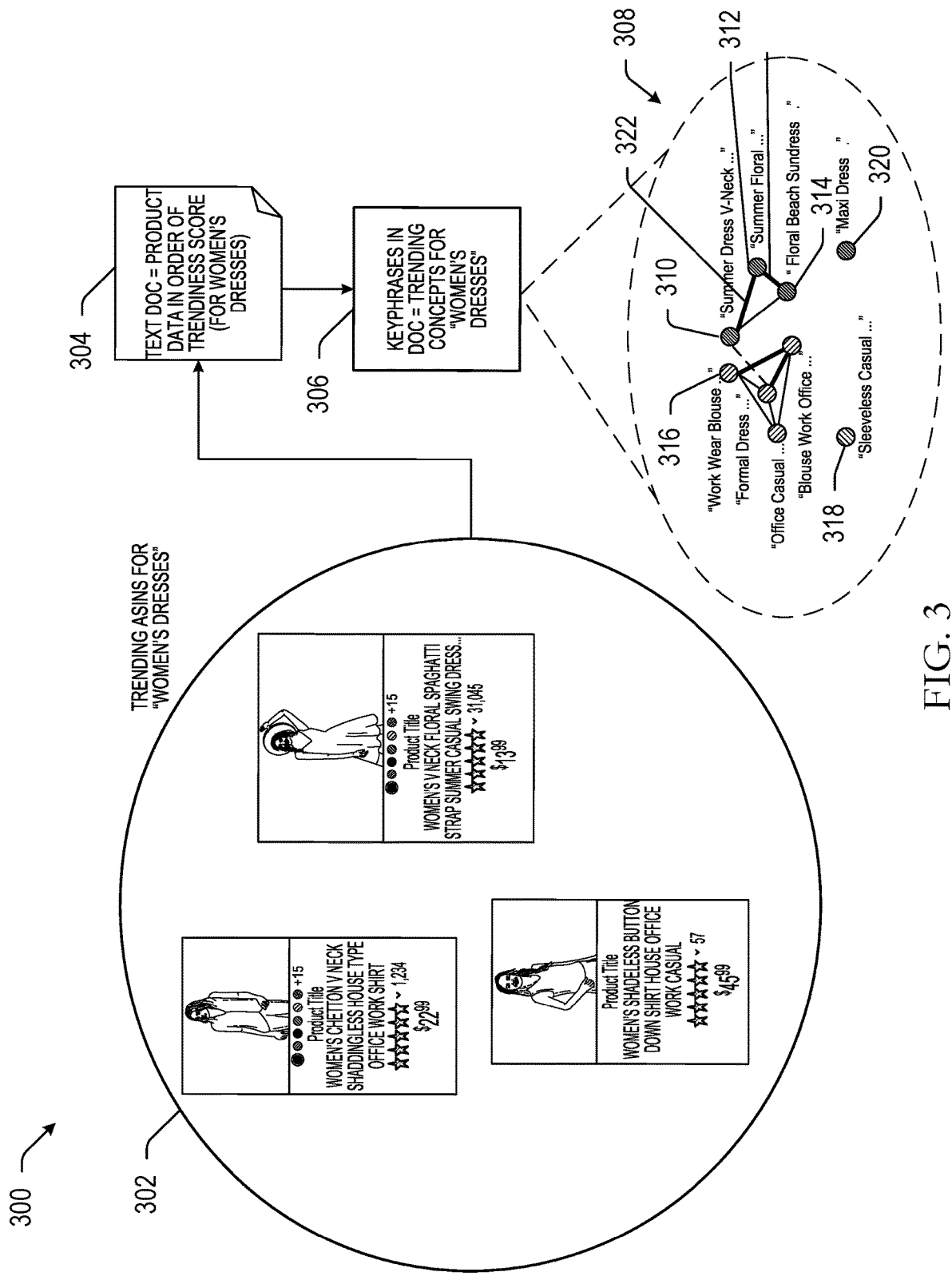
FIG. 3 illustrates another example process flow for trend interpretation, in accordance with one or more example embodiments of the disclosure.
Figure 4:
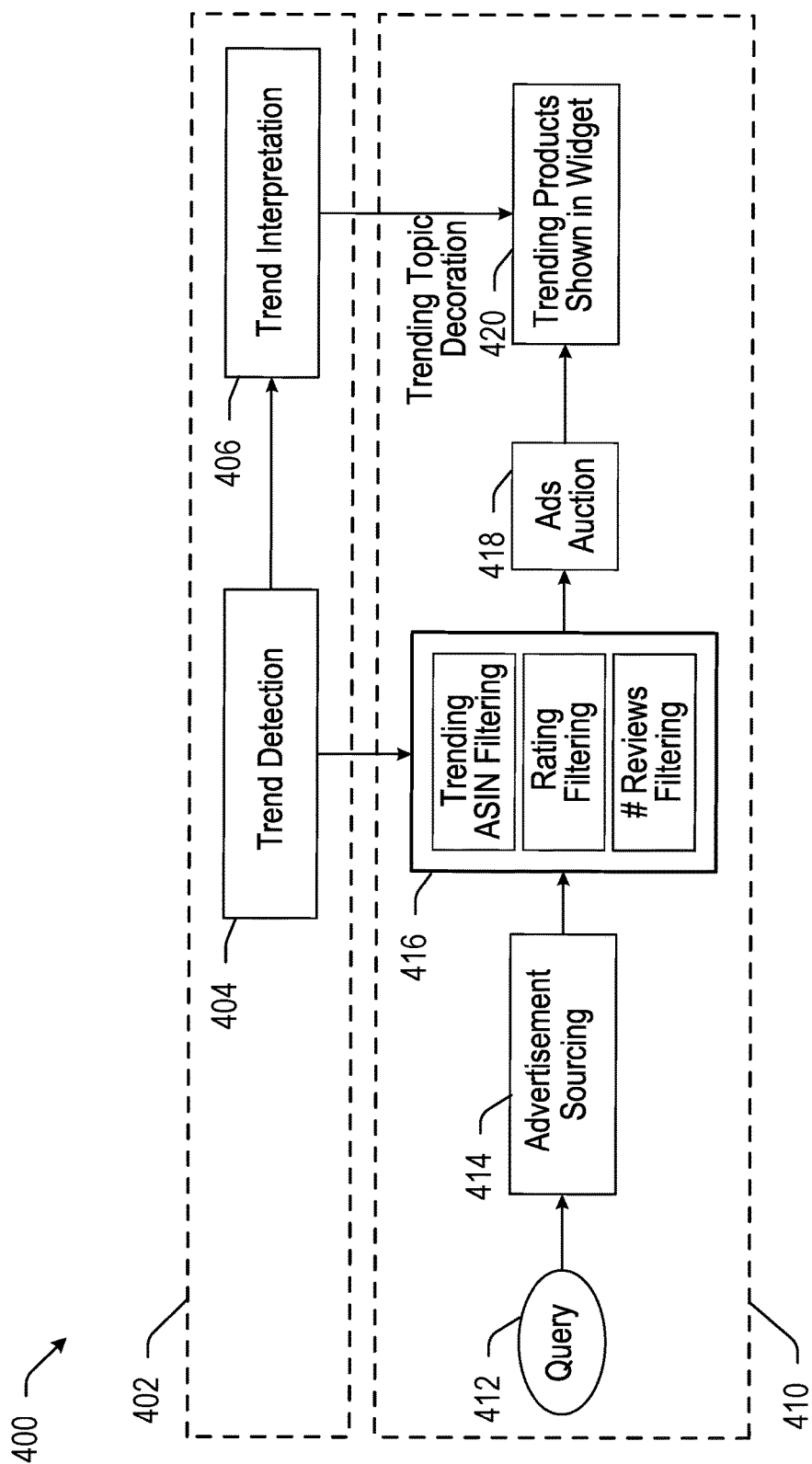
FIG. 4 illustrates an example process flow for an example use case associated with determining trending products, in accordance with one or more example embodiments of the disclosure.

Any of this information (for example, the search queries, product identifiers associated with the products, products titles, product descriptions, CTR and CVR values, and/or any other information) may be used to determine whether any of the products should be classified as trending products (the specific process for determining whether a product is trending is described in additional detail with respect to FIGS. 2-4). Once the trending products are identified, they may be provided to a natural language processing model. In one or more embodiments, the identifiers associated with the trending products may specifically be provided to an unsupervised graph-based model 130 (however, this is not intended to be limiting and any other type of machine learning model, artificial intelligence, or simple logical algorithm may also be used). The unsupervised graph-based model may then perform a "trend interpretation process" (also described in additional detail with respect to the process flows of FIGS. 2-4) by extracting portions of the information associated with the products (for example, some or all of the product titles, which may be referred to as a "keyphrase" herein) to determine relative importance rankings of the various keyphrases associated with the trending products. The unsupervised graph-based model 130 may output an indication of the most important keyphrases.

Figure 5:
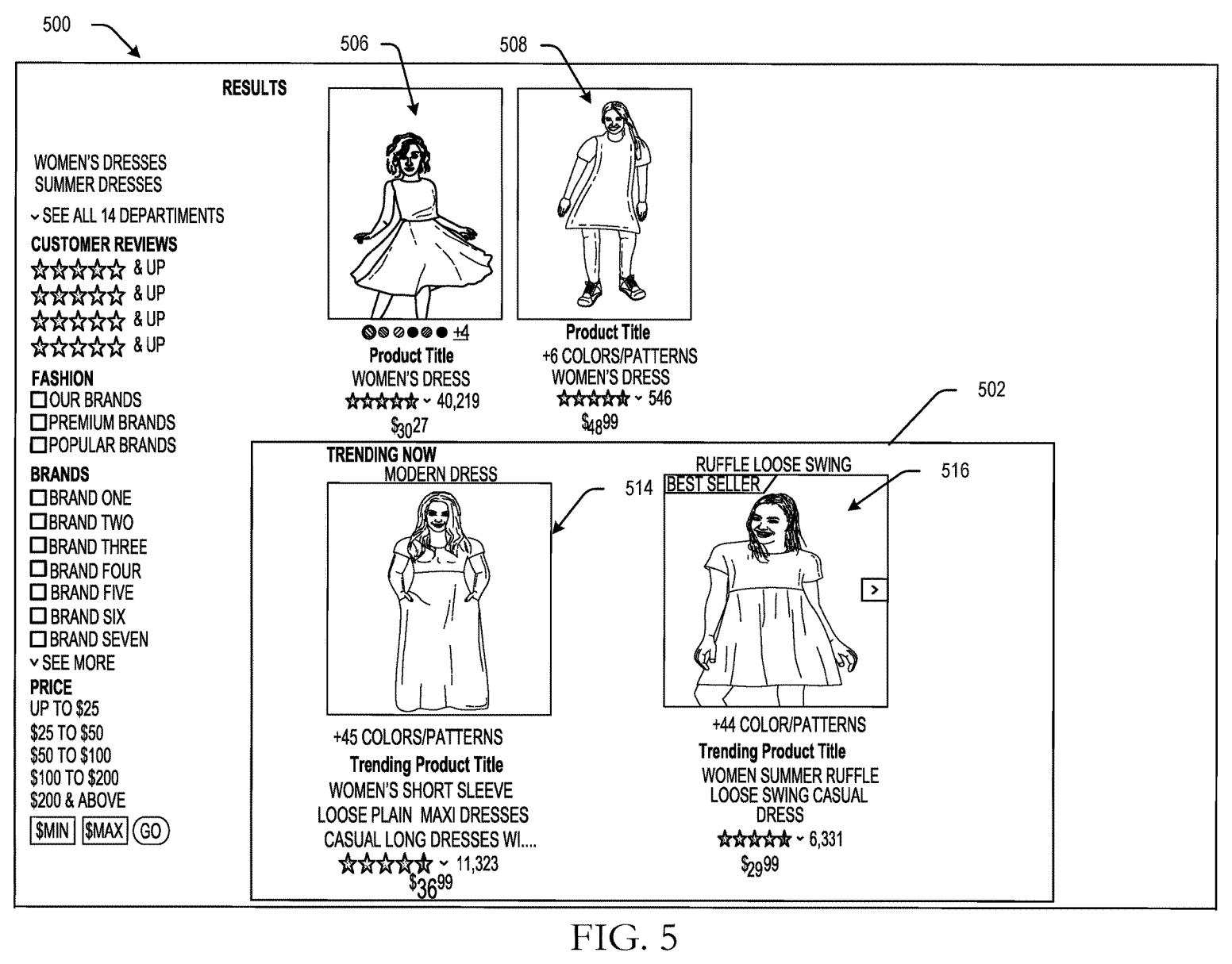

Finally, the trending products and the keyphrases output by the unsupervised graph-based model 130 may be used to generate a trending products widget 150 that may then be presented to a user browsing the online retail shopping platform. An example of a trending products widget is shown in FIG. 5.

FIG. 2 illustrates an example process flow 200 for trend detection and trend interpretation, in accordance with one or more example embodiments of the disclosure. FIG. 3 provides additional implementation details about the trend interpretation analysis as well.

Operation 202 involves receiving one or more search queries. For example, a search query may include a user input into the online retail shopping platform to identify specific types of products included within an online catalogue of the online retail shopping platform. To formulate a search query, a user may type or otherwise enters a search string, which may include one or more search terms or "keywords," into a search box included within a user interface of the online retail shopping platform (as shown in FIG. 1). The search interface may also provide an option for the user to limit the search to a particular top-level browse category, or to another collection of items. In addition, the search interface may support the ability for users to conduct field-restricted searches in which search strings are entered into search boxes associated with specific database fields (author, artist, actor, subject, title, abstract, reviews, etc.). When a user submits a search query, a web server may be used to generate and returns a list of the items that are relevant to the search query. For example, a user may input a "gaming laptop" search query, and the online retail shopping platform may then direct the user to a web page presenting a listing of relevant gaming laptop products for sale on the online retail shopping platform. Any number of users may enter these types of search queries for any number of different types of products and some or all of these search queries may be captured by operation 202.

Operation 202 may also involve obtaining any other types of information associated with a product search performed by the user. For example, the information may include data relating to specific products that a user selected in search results. Once the search query is submitted and the product search results are presented to the user, the user may select a particular product to navigate to a product-specific page associated with the product. The product-specific page may include additional information about the product, as well as an option to add the product to a virtual shopping cart and/or purchase the product. An indication of a selection of the product from the search results may represent the aforementioned CTR. As another example, the information may include indications of product purchases made by the user. That is, the user not only selected the product to view the product-specific page, but also completed a purchase of the product through the online retail shopping platform. An indication of a purchase may represent the aforementioned CVR. Any other information may also be obtained, such as information about the products selected by users (e.g., product title, price, seller, etc.). It should be noted that while reference is made to a user selecting a product from a search results page, a product may similarly be selected from any other location within the online retail shopping platform (or even from outside the online retail shopping platform) as well.

Operation 204 involves identifying trending products optionally using the information obtained in operation 202.

In some cases, the trending products may be identified using product identifiers associated with the products (however, trending products may also be identified using any other information associated with the products as well). A product identifier may refer to a combination of alphanumeric characters used to identify a particular product in the virtual catalogue associated with the online retail shopping platform (this is not intended to be limiting and a product may be identified in any other suitable manner as well). Detecting these trending products may not be a trivial task because "trending" may be an ambiguous label in the absence of ground truth data. In the absence of ground truth data, heuristics may be used. As aforementioned, the trend detection may specifically be performed using CTR and CVR metrics. This is not intended to be limiting and any other metrics may also be considered as well.

In one or more embodiments, the heuristic method for detecting the trending products may involve computing a "$\Delta i$" (also referred to as a "trending score" herein) value for each product "i" based on the CTR and CVR data obtained for the product during a given time period (for example, week "t" and week "t+1" or any other time period). The $\Delta i$ values may be calculated using Equation 1 provided below.

$$\Delta_i = \{CTR_i + p^*CVR_i\}_{week_{t+1}} - \{CTR_i + p^*CVR_i\}_{week_t} \quad \text{(Equation 1)},$$

where p is a weighting factor to combine the $CTR_i$ and $CVR_i$ associated with product "i." For each browse node, a given number (for example, 100 or any other number) of top product identifiers may be identified using the calculated $\Delta i$ values for each product. For example, the top 100 (or any other number) largest $\Delta i$ values may be identified to determine the top trending products. By using a combination of CTR and CVR in $\Delta i$ as shown above, a balance may be struck between the tendency to surface high-click product identifiers (associated with high ads revenue) against the tendency to show high conversion product identifiers.

In some instances, the value of p in Equation 1 may also be optimized based on the following two Equations:

simplified_$iGCP$=ExchangeValue*$OPS$+
0.98*$Ads_{Revenue}$=0.062*$sp_{attributed_{ops}}$+0.98*sponsored_product_revenue  (Equation 2); and simplified $iGCP$/impression=simplified$iGCP$/number of impressions  (Equation 3).

Following the above metric, a value of p may be selected that surfaces trending product identifiers with the most iGCP gain. The iGCP/impression metric for different values of p are shown below in Table 1. For example, the table shows that an optimal value of p may be 12, however, this is not intended to be limiting, and any other value of p may also be used. These values and the values shown in Table 1 are merely exemplary and not intended to be limiting.

FIG. 2 include the keyphrases "summer floral" and "office casual." These keyphrases may illustrate an example of additional information that may be determined through the trend interpretation process of operation 206.

In one or more embodiments, the trend interpretation may be based on the notion that a listing of trending product titles may include certain prevalent keyphrases that are common across multiple products (e.g., these keyphrases "co-occur" between products within a given fixed-length text window (e.g., a window for the text of a product title, description, review, etc.) associated with the analysis). This analysis may be performed using an unsupervised graph-based content extraction model (for example, a type of natural language processing (NLP) model). An unsupervised model may be beneficial if labeled training data does not exist to extract keyphrases in our setup, however, a supervised model may also be used as well. These keyphrases may be extracted from information associated with the trending products for the trend interpretation analysis described with respect to operation 206. Further details about how this extraction is performed are provided in the flow process 300 of FIG. 3.

Generally, graph-based approaches employ a ranking algorithm, such as Hyperlink Induced Topic Search (HITS) or PageRank. These algorithms compute the importance of a vertex (the terms "vertex" and "node" may be used interchangeably herein) in the graph. This may be accomplished by considering both the local vertex-specific information as well as global information that is recursively computed from the entire graph. These graph-based ranking models use a voting strategy to rank the vertices. A link between one vertex and another vertex is considered a vote for the other vertex. The importance of the vertex casting the vote also determines the significance of the vote as well which is taken into consideration by the ranking model as well. A score for a given vertex thus may be determined based not only on the votes the vertex received, but also on the scores of the vertices casting these votes. In this case, the vertices may include the keyphrases that are extracted for each of the trending products.

In one or more embodiments, the unsupervised graph-based model may determine "importance ranking" values for each vertex. These importance ranking values may be represented by $v_i$ shown in Equation (4) below. With respect to Equation (4), a token-graph $G = (V, E)$ may be constructed from a document D followed by a description of the biased PageRank algorithm on $G$. To construct $G$, tokens (words) from document D are considered as nodes. In some cases, a parts-of-speech filter (e.g., to restrict to nouns and adjectives) may be applied to the list of tokens as a preprocessing

TABLE 1

Searching for the optimal CTR-CVR weighting parameter p.

| Metric | p = 2 | p = 5 | p = 8 | p = 10 | p = 12 | p = 15 | p = 18 | p = 20 | p = 25 |
|---|---|---|---|---|---|---|---|---|---|
| iGCP/imp. | 0.01496 | 0.01542 | 0.01554 | 0.01558 | 0.01562 | 0.01546 | 0.0155 | 0.01548 | 0.01535 |

Once the "$\Delta i$" values associated with the product identifiers are determined in operation 204, and the top threshold number of products are identified, operation 206 may be performed. Operation 206 involves performing trend interpretation. Trend interpretation includes performing a further analysis to determine the reasoning behind certain trends such that additional information may be provided to users within the trending products widget. For example, the trending products presented in association with operation 208 of step. Two nodes in $G$ are connected by a weighted edge if the corresponding words co-occur within a window of w contiguous tokens in D. The weight of the edge is based on the co-occurrence count of the two tokens within a window of w contiguous tokens in D. Given such a graph $G$, the importance of each token $v_i$ (vertex in the graph) is computed in an iterative manner via the biased PageRank algorithm as described below:

$$v_i = \text{bias}_i(1-d) + d * \left( \sum_{j \in \mathcal{N}(i)} \frac{e_{ij}}{\sum_{k \in \mathcal{N}(j)} e_{kj}} * v_j \right), \quad \text{(Equation 4)}$$

where d is the damping factor (typically 0.85), $e_{ij}$ denotes the weight for edge between i and j, $\mathcal{N}_i$ is the set of vertices which share an edge (with non-zero edge weight) with vertex i, and the bias term provides additional position based biasing toward the vertex importance. In a document not all words may necessarily be equal and quite often, important words show up in the early parts of a document. With this intuition, a bias term may be introduced to provide higher importance to words occurring early in the document. The intuition stems from favoring product identifiers with a higher trendiness score. The document D may be constructed by appending titles from trending products in the same order as they are ranked via the product identifier trendiness score, and hence favor keyphrases found in the top trending products.

Additionally, a suitable time window may need to be identified for purposes of trend detection and trend interpretation. In this manner, the trending product widgets may present recent trending products rather than relying on metrics spanning back an entire history of a product. This may be desirable because product trends may vary significantly within short time frames. For example, metrics may be limited to a week worth of data, however, this is not intended to be limiting and any other time window may similarly be used.

Operation 208 involves presenting the trending products associated with the trending product identifiers determined in operation 206. The trending products may be presented to a user through trending products widget displayed on a user interface associated with the online retail shopping platform in any suitable manner. As shown in FIG. 2, reasons for which the products are trending are also presented, such as the keyphrases identified for the trending products (e.g., "summer floral," "office casual," etc.). FIG. 5, described in additional detail below, illustrates one example of a presentation of trending products under a "dresses" clothing category.

In some instances, the specific types of trending products that are presented through the user interface may depend on the types of products for which the user is searching. For example, if a user is searching the online retail shopping platform for a grill, then the trending products widget may display trending grills or other types of products that relate to grills or outdoor cooking. However, in other instances, the types of products presented in the trending products widget may be agnostic of the products for which the user is searching. For example, the trending products widget may simply present the most popular products in general for a given time period.

FIG. 3 illustrates another example process flow 300 for trend interpretation, in accordance with one or more example embodiments of the disclosure. The process flow 300 may illustrate additional implementation details relating to the trend interpretation aspect of the high-level process flow 200 shown in FIG. 2.

Operation 302 involves obtaining trending products identifiers. For example, these may be the outputs of the "trend detection" operation shown as operation 204 in FIG. 2.

Operation 304 involves storing the trending product identifiers associated with the trending products. In one or more embodiments, the information may specifically be stored within a text document. However, this is not intended to be limiting and the information may also be stored in any other manner. For example, the information may be stored within a database, etc. (the text document, database, and/or any other location in which the data is stored may generally referred to as a "storage location" herein). Any other types of information may also be stored in addition to product identifiers, such as product identifiers, product titles, user reviews for the products, seller information, etc. In some cases, information associated with multiple trending products may be stored within the document and may be organized based relative trending scores determined in trend detection (e.g., the "Δi" values). For example, the product identifiers may be ranked from highest trending score to lowest trending score (however, this is not intended to be limiting).

Once the information is stored, operation 306 involves extracting keywords from the information stored in operation 304. The keyword extraction may be performed, for example, using a natural language processing (NLP) model. In one or more embodiments, such determinations are specifically made using a graph-based unsupervised model as described herein. However, any other type of machine learning model (or any other type of artificial intelligence or simple logic-based algorithm) may also be used as well. The extracted keyphrases may then be provided to the unsupervised graph-based model 308 to determine relative "importance ranking" values for each keyphrase.

An example visualization of an unsupervised graph-based model 308 is illustrated in FIG. 3 as well. The unsupervised graph-based model 308 includes one or more nodes (these may be the same as the "vertices" described herein), such as node 310, node 312, node 314, node 316, node 318, node 320, and/or any other node shown in the figure or otherwise. Each of the nodes may represent keyphrases extracted from information associated with the trending products. For example, the keyphrases may be strings extracted from the product titles. However, this is not intended to be limiting and the keyphrases may include any other types of information, such as product descriptions, user reviews of products, and the like.

The unsupervised graph-based model 308 also shows that some of the nodes may be linked together. For example, link 322 is provided between node 310 and node 312, link 324 is provided between node 312 and node 314, etc. A link may be formed between two specific nodes based on a determination that the two keyphrases co-occurred within a given fixed-length text window. Two keyphrases "co-occurring" may refer to the two keyphrases being included in any of the input information obtained for searched products during the given fixed-length text window. For example, the link 322 provided between node 310 and node 312 indicates that the keyphrases "summer dress v-neck" and "summer floral" co-occurred during the given fixed-length text window.

Additionally, FIG. 3 shows that the links may be associated with varying degrees of thickness. The thickness of a link between two nodes may indicate a number of co-occurrences of the keyphrases within the fixed-length text window. For example, a link may be formed between two nodes based on a single instance of a co-occurrence during the fixed-length text window, and the link may be progressively thickened for each additional co-occurrence. The importance ranking may be determined based on a combination of the links and the thicknesses of the links (e.g., the number of keyphrases with which a particular keyphrase has a co-occurrence, as well as the number of co-occurrences with each keyphrase). Specifically, the importance or ranking provided to a given node may be determined using Equation 4 provided above.

Once the rankings are provided to the keyphrases included in the unsupervised graph-based model 308, the highest ranked keyphrases may be determined and presented along with the trending products through the trending products widget (an example is illustrated in FIG. 5).

FIG. 4 illustrates an example process flow 400 for an example use case associated with determining trending products, in accordance with one or more example embodiments of the disclosure. Although this description focus on an advertising use case, this is not intended to be limiting and the method described herein may be extended to any other context.

The process flow 400 includes a first sub process flow 402 and a second sub process flow 410. The first sub process flow 402 may include the operations performed within process flows 300 and/or 400. For example, operation 404 involves performing the trend detection and operation 406 involves performing the trend interpretation (which may be the same as the trend detection and trend interpretation described with respect to process flows 200 and 300 of FIGS. 2 and 3, respectively).

The second sub process flow 410 includes a process flow associated with a user performing a product search using the online retail shopping platform in real-time. Operation 412 involves receiving a search query from the user. Operation 414 involves advertisement sourcing. When a shopper enters a search query, an advertisement sourcing and decoration engine may perform advertisement sourcing.

Operation 416 involves filtering the sourcing results by a regularly updated trending product identifier lookup table produced by operation 404 of the first sub process flow 402 (the trend detection model). The sourcing results may also be filtered by product rating score and number of reviews, for example. At this stage, only relevant, trending, and high-quality product identifiers may be kept for operation 418. In operation 418, the rank of these relevant trending product identifiers may be determined based on the product identifier's bid, estimated CTR, and relevance score, for example. The top "k" number of product identifiers may then be displayed in the trending products widget in operation 420. The corresponding keyphrases from trending products (extracted in operation 404) may also be presented through the trending products widget as well.

FIG. 5 illustrates an example user interface 500 including trending products, in accordance with one or more example embodiments of the disclosure.

Particularly, the user interface 500 illustrates a search results page associated with an online retail shopping platform that includes a trending product widget 502 described herein. For example, the search results page may be presented based on a search query for "summer dresses." The search results page presents a listing of products that are determined to be relevant to the search query. For example, the search results page shows product 506 and product 508, as well as any other number of products.

In addition to the search results that are presented based on the search query, the trending products widget 502 may also be presented. The trending products widget 502 may also present a listing of different products (for example, product 514 and product 516, as well as any other number of products). The trending products widget 502 may also include additional information, such as the keywords determined using the trend interpretation methods described herein. For example, keyphrase "modern dress" is provided along with product 514.

Figure 6:
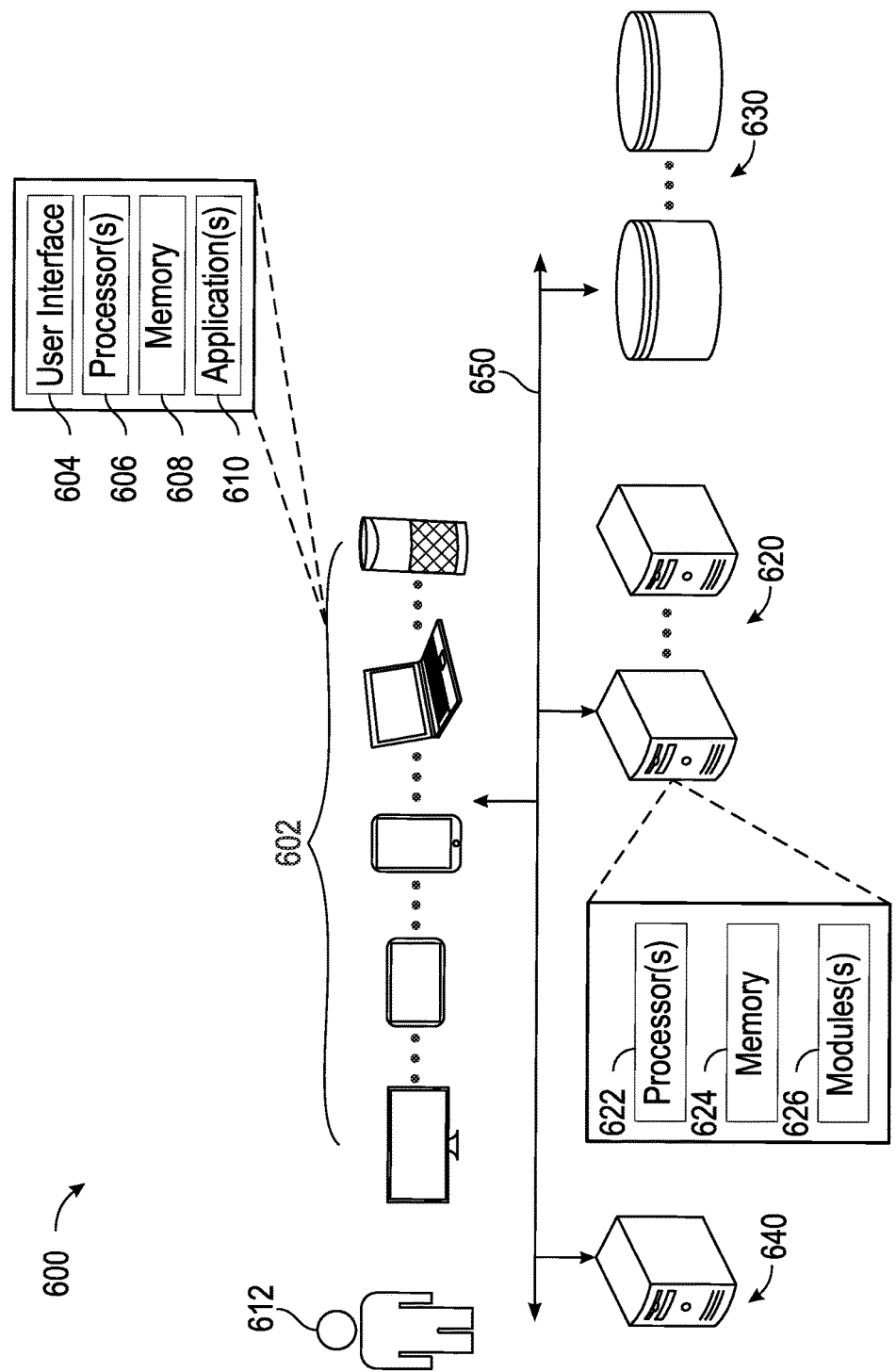
FIG. 6 is a schematic illustration of an example system, in accordance with one or more example embodiments of the disclosure.

FIG. 6 is a schematic illustration of an example system 600 in accordance with one or more example embodiments of the disclosure. In one or more embodiments, the system 600 may include at least one or more user devices 602, one or more computing systems 620, one or more computing systems 640, and/or one or more databases 630. However, these components of the system 600 are merely exemplary and are not intended to be limiting in any way. For simplicity, reference may be made hereinafter to a "user device 602," a "computing system 620," a "database 630," and a "computing system 640," however, this is not intended to be limiting and may still refer to any number of such elements.

The mobile device 602 may be any type of device that is used by a user 612 while browsing for products. For example, the user device 602 may include a desktop or laptop computer, tablet, smartphone, and/or any other type of device. The mobile device 602 may also include one or more processors 606 and memory 608. The mobile device 602 may also include an application 610 that may allow the user 612 to browse an online retail shopping platform, enter search queries, purchase products, view a trending products widget, and/or perform any other actions with respect to browsing for products. The products may be displayed to the user through a user interface 604 of the mobile device 602. Any trending product widgets that are generated in association with the application 610 may also be presented through the user interface 604. Additionally, while reference is made to a "mobile device," this may similarly apply to any other type of device as well.

The computing system 620 may be a local or remote system (for example, a server and/or any other type of system) that is used to perform any of the processing described herein (for example, computing system 620 may host any of the model(s) described herein and/or may perform any of the operations described herein relating to trend detection, trend interpretation, and/or any other processes described herein or otherwise). The computing system 620 may also include one or more processors 622 and memory 624. Any of the processes may be facilitated by one or more module(s) 626.

The database 630 may include any storage medium that may be used to store any of the date described herein or otherwise. For example, the database 630 may store input data relating to user search queries, past search queries, trending product identifiers, product reviews, and/or any other data. The computing system 620 (and/or any other device or system herein that may be used to perform the trend detection and/or trend interpretation) may access the data in the database 630 to perform the trend detection and/or trend interpretation. For example, keyphrases may be extracted from product titles associated with trending products and these keyphrases may be provided to the unsupervised graph-based model for trend interpretation.

The computing system 640 may be a system that hosts the online retail shopping platform on which the trending products widget generated based on the trend detection and trend interpretation performed by the computing system 620. However, this system configuration is not intended to be limiting and the computing system 620 and computing system 640 may similarly be combined into one computing system.

In one or more embodiments, any of the elements of the system 600 (for example, the user device 602, the computing system 620, the database 630, the computing system 640, and/or any other element described with respect to FIG. 6 or otherwise) may be configured to communicate via a communications network 650. Examples of communication networks are further described with respect to FIG. 8. Finally, any of the elements of the system 600 may include any of the elements of the computing device 800 as well.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Figure 7:
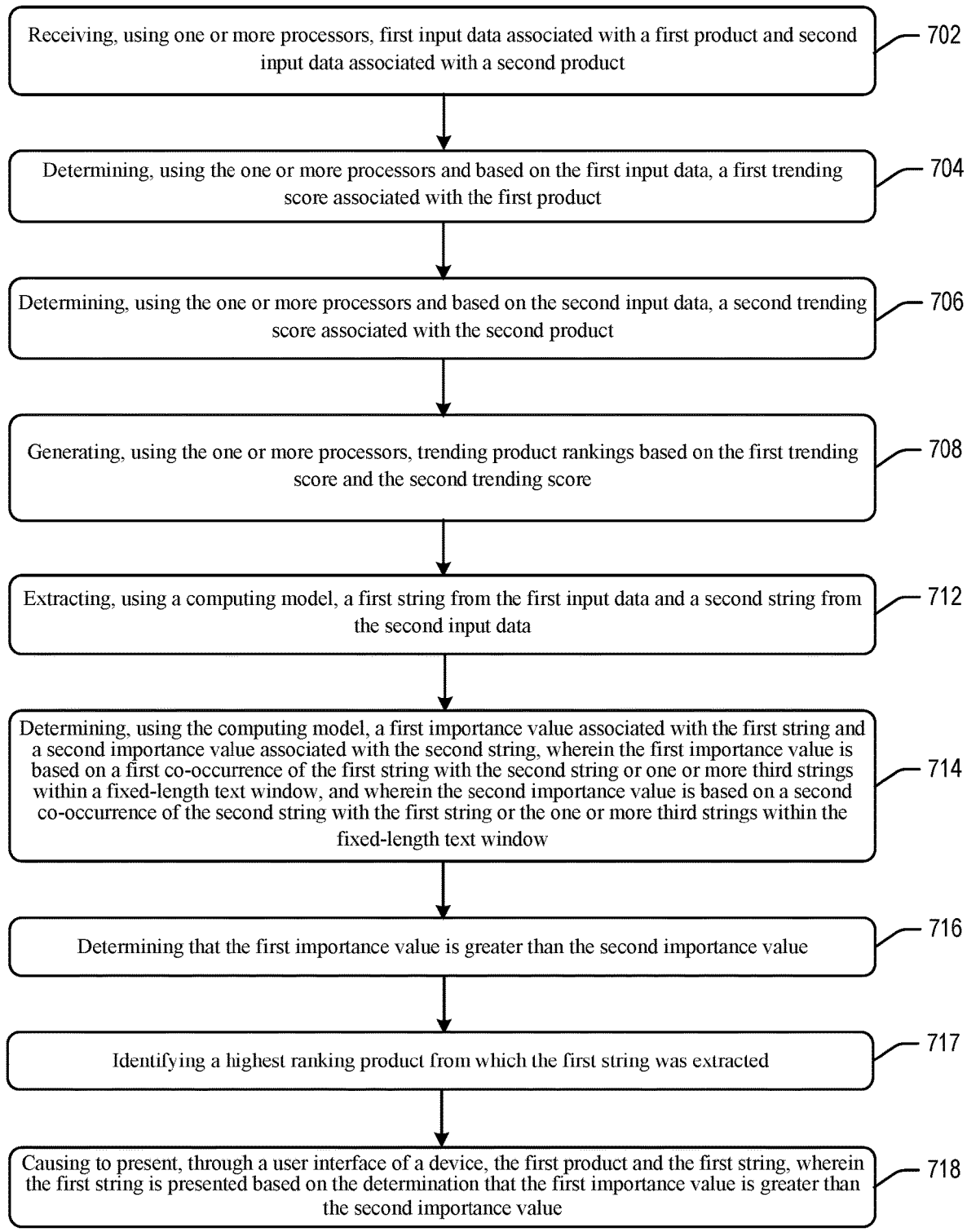
FIG. 7 illustrates an example method, in accordance with one or more example embodiments of the disclosure.

FIG. 7 depicts an example process flow 700 for generation and presentation of dynamic product summary images in accordance with one or more example embodiments of the disclosure. Some or all of the blocks of the process flows in this disclosure may be performed in a distributed manner across any number of devices. The operations of the process flow 700 may be optional and may be performed in a different order.

At block 702 of the process flow 700, computer-executable instructions stored on a memory of a device, such as computing device 800 and/or any other device, may be executed to receive, using one or more processors, first input data associated with a first product and second input data associated with a second product.

At block 704 of the process flow 700, computer-executable instructions stored on a memory of a device or system, such as computing system 640, user device 602, computing system 240, computing device 620 and/or any other device or system, may be executed to determine, using the one or more processors and based on the first input data, a first trending score associated with the first product.

At block 706 of the process flow 700, computer-executable instructions stored on a memory of a device, such as computing device 800 and/or any other device, may be executed to determine, using the one or more processors and based on the second input data, a second trending score associated with the second product.

At block 708 of the process flow 700, computer-executable instructions stored on a memory of a device, such as computing device 800 and/or any other device, may be executed to determine, using the one or more processors, to generate a ranking of trending products that ranks the trending products based on their respective trending scores.

At block 712 of the process flow 700, computer-executable instructions stored on a memory of a device, such as computing device 800 and/or any other device, may be executed to extract, using a computing model, a first string from the first input data and a second string from the second input data.

At block 714 of the process flow 700, computer-executable instructions stored on a memory of a device, such as computing device 800 and/or any other device, may be executed to determine, using the computing model, a first importance value associated with the first string and a second importance value associated with the second string, wherein the first importance value is based on a first co-occurrence of the first string with the second string or one or more third strings within a fixed-length text window, and wherein the second importance value is based on a second co-occurrence of the second string with the first string or the one or more third strings within the fixed-length text window.

At block 716 of the process flow 700, computer-executable instructions stored on a memory of a device, such as computing device 800 and/or any other device, may be executed to determine that the first importance value is greater than the second importance value.

At block 717 of the process flow 700, computer-executable instructions stored on a memory of a device, such as computing device 800 and/or any other device, may be executed to identify a highest ranking product from which the first string (or any string identified as a dominant string) was extracted. For example, some extracted strings may be used by multiple products' names, descriptions, etc. The product selected for the trending products widget based on the importance value of the string may be the highest ranking product that uses the string (e.g., based on the rankings of block 708).

At block 718 of the process flow 700, computer-executable instructions stored on a memory of a device, such as computing device 800 and/or any other device, may be executed to cause to present, through a user interface of a device, the first product and the first string, wherein the first string is presented based on the determination that the first importance value is greater than the second importance value.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

Figure 8:
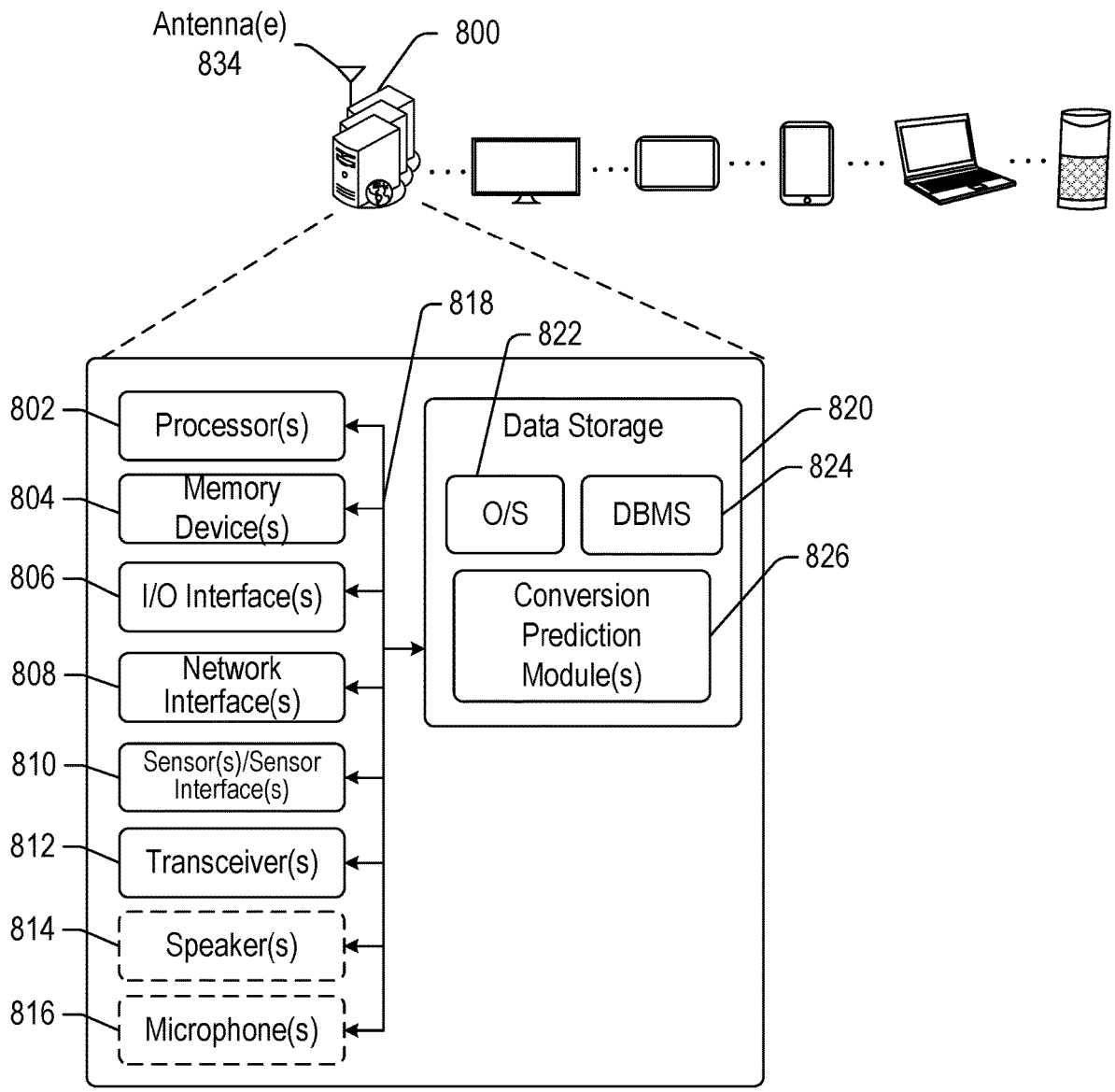
FIG. 8 is a schematic block diagram of an illustrative device, in accordance with one or more example embodiments of the disclosure.

FIG. 8 is a schematic block diagram of an illustrative computing device 800 in accordance with one or more example embodiments of the disclosure. The computing device 800 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The computing device 800 may correspond to an illustrative device configuration for the devices of FIGS. 1-7.

The computing device 800 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 800 may include one or more processors (processor(s)) 802, one or more memory devices 804 (generically referred to herein as memory 804), one or more input/output (I/O) interface(s) 806, one or more network interface(s) 808, one or more sensors or sensor interface(s) 810, one or more transceivers 812, one or more optional speakers 814, one or more optional microphones 816, and data storage 820. The computing device 800 may further include one or more buses 818 that functionally couple various components of the computing device 800. The computing device 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the computing device 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the computing device 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more trend detection and interpretation module(s) 826. Some or all of these module(s) may be sub-module(s). Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to correspondingly named components earlier in this disclosure.

The data storage 820 may further store various types of data utilized by components of the computing device 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, the datastore(s) may include, for example, purchase history information, user action information, user profile information, a database linking search queries and user actions, and other information.

The processor(s) 802 may be configured to access the memory 804 and execute computer-executable instructions loaded therein. For example, the processor(s) 802 may be configured to execute computer-executable instructions of the various program module(s), applications, engines, or the like of the computing device 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the dynamic trend detection and interpretation module(s) 826 may include computer-executable instructions, code, or the like that responsive to execution by one or more of the processor(s) 802 may perform functions including, but not limited to, performing any functionality associated with detecting any trending products, performing trend interpretation using the unsupervised graph-based model, generating a trending product widget to display, and/or any other functionality described herein.

Referring now to other illustrative components depicted as being stored in the data storage 820, the O/S 822 may be loaded from the data storage 820 into the memory 804 and may provide an interface between other application software executing on the computing device 800 and hardware resources of the computing device 800. More specifically, the O/S 822 may include a set of computer-executable instructions for managing hardware resources of the computing device 800 and for providing common services to other application programs (e.g., managing memory allocation among various application programs). In certain example embodiments, the O/S 822 may control execution of the other program module(s) to dynamically enhance characters for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 800 is a mobile device, the DBMS 824 may be any suitable light-weight DBMS optimized for performance on a mobile device.

Referring now to other illustrative components of the computing device 800, the input/output (I/O) interface(s) 806 may facilitate the receipt of input information by the computing device 800 from one or more I/O devices as well as the output of information from the computing device 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 800 may further include one or more network interface(s) 808 via which the computing device 800 may communicate with any of a variety of other systems, platforms, networks, devices, and so forth. The network interface(s) 808 may enable communication, for example, with one or more wireless routers, one or more host servers, one or more web servers, and the like via one or more of networks.

The antenna(e) 834 may include any suitable type of antenna depending, for example, on the communications protocols used to transmit or receive signals via the antenna (e) 834. Non-limiting examples of suitable antennas may include directional antennas, non-directional antennas, dipole antennas, folded dipole antennas, patch antennas, multiple-input multiple-output (MIMO) antennas, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the computing device 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computing device 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 814 may be any device configured to generate audible sound. The optional microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computing device 800 may include alternate and/or additional hardware, software, or firmware components beyond those described or depicted without departing from the scope of the disclosure. More particularly, it should be appreciated that software, firmware, or hardware components depicted as forming part of the computing device 800 are merely illustrative and that some components may not be present or additional components may be provided in various embodiments. While various illustrative program module(s) have been depicted and described as software module(s) stored in data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method for generating online widgets for trending items, the method comprising:
receiving, using one or more processors, via an online retail system at a first time, first search input data associated with a first product and second search input data associated with a second product, wherein the first product and second product are included within a catalog of the online retail system;

extracting, using an unsupervised natural language processing model, unlabeled data from the online retail system, the unlabeled data comprising a first string from a first product title of a first product and a second string from a second product title of a second product;

identifying, using the unsupervised natural language processing model, strings in the unlabeled data, the strings comprising the first string and the second string;

generating, using the unsupervised natural language processing model, nodes comprising respective strings of the strings, the nodes comprising a first node representing the first string and a second node representing the second string;

generating, using the unsupervised natural language processing model, a token graph comprising the nodes and weighted edges between the nodes, wherein the weighted edges represent how often strings represented by two connected nodes co-occur in a window of contiguous strings of the unlabeled data within a fixed-length text window;

determining, using the unsupervised natural language processing model, a first weighted edge connecting the first node and the second node, wherein the first weighted edge is based on a first co-occurrence of the first string with the second string or one or more third strings within the fixed-length text window;

determining that a first importance value based on the first weighted edge is greater than a second importance value based on a second weighted edge connecting the first node to a third node of the nodes;

identifying, based on the first importance value being greater than the second importance value, that the first string was extracted from the first product title;

generating, based on identifying that the first importance value is greater than the second importance value, a widget comprising images of the first product and at least one additional tending product at the online retail system, and further comprising an indication that the first string is a basis for why the first product and the at least one additional are trending; and causing to present, sequentially to the first search input data and the second search input data at the first time, through a user interface of the online retail system, the widget.

2. The method of claim 1, wherein the first importance value is further based on a number of other strings with which the first string has a co-occurrence within the fixed-length text window and a number of co-occurrences with the other strings.

3. The method of claim 1, further comprising:
determining that the first product is the first type of product, wherein the indication that the first string is a basis for why the first product and the at least one additional product are trending is that the first product is the first type of product.

4. The method of claim 1, further comprising:
storing the first input data in a storage location; and
extracting, using the natural language processing model, the first input data from the storage location,
wherein generating the nodes is based on extracting the first input data from the storage location.

5. A method for generating online widgets for trending items, the method comprising:
receiving, using one or more processors, via an online retail system, first search input data associated with a first product and second search input data associated with a second product;

extracting, using an unsupervised natural language processing model, unlabeled data from the online retail system, the unlabeled data comprising a first string associated with the first product and a second string associated with the second product;

identifying, using the unsupervised natural language processing model, strings in the unlabeled data, the strings comprising the first string and the second string;

generating, using the unsupervised natural language processing model, nodes comprising respective strings of the strings, the nodes comprising a first node representing the first string and a second node representing the second string;

generating, using the unsupervised natural language processing model, a token graph comprising the nodes and weighted edges between the nodes, wherein the weighted edges represent how often strings represented by two connected nodes co-occur in a window of contiguous strings of the unlabeled data within a fixed-length text window;

determining, using the unsupervised natural language processing model, a first weighted edge connecting the first node and the second node, wherein the first weighted edge is based on a first co-occurrence of the first string with the second string or one or more third strings within the fixed-length text window;

determining that a first importance value based on the first weighted edge is greater than a second importance value based on a second weighted edge connecting the first node to a third node of the nodes;

generating, based on determining that the first importance value is greater than the second importance value, a widget comprising images of the first product and at least one additional tending product at the online retail system, and further comprising an indication that the first string is a basis for why the first product and the at least one additional are trending; and causing to present, through a user interface of a device, the widget.

6. The method of claim 5, wherein the first importance value is further based on a number of other strings with which the first string has a co-occurrence within the fixed-length text window and a number of co-occurrences with the other strings.

7. The method of claim 5, further comprising:
determining that the first product is a first type of product, wherein the indication that the first string is a basis for why the first product and the at least one additional product are trending is that the first product is the first type of product.

8. The method of claim 5, further comprising:
determining a first trending score associated with the first product based on click-through-rate (CTR) data and conversion-rate (CVR) data associated with the first product; and
generating the first node based on the CTR data and the CVR data.

9. The method of claim 5, wherein the first string includes at least a portion of a product title, a product description, or a product review associated with the first product.

10. The method of claim 5, wherein the first input data includes at least one of: a search query associated with the first product and a product title.

11. The method of claim 5, further comprising:
storing the first input data in a storage location; and
extracting, using the unsupervised natural language processing model, the first input data from the storage location,
wherein generating the nodes is based on extracting the first input data from the storage location.

12. The method of claim 5, further comprising:
identifying, based on the determination that the first importance value is greater than the second importance value, that the first string is associated with the first product and a third product;
determining that the first trending score is greater than a third trending score of the third product; and
selecting, based on the determination that the first trending score is greater than the third trending score, the first product and not the third product for presentation with the first string in the widget.

13. A system for generating online widgets for trending items, the system comprising:
memory that stores computer-executable instructions; and
one or more processors configured to access the memory and execute the computer-executable instructions to:
receive, via an online retail system, first search input data associated with a first product and second search input data associated with a second product;
extract, using an unsupervised natural language processing model, unlabeled data from the online retail system, the unlabeled data comprising a first string associated with the first product and a second string associated with the second product;
identify, using the unsupervised natural language processing model, strings in the unlabeled data, the strings comprising the first string and the second string;
generate, using the unsupervised natural language processing model, nodes comprising respective strings of the strings, the nodes comprising a first node representing the first string and a second node representing the second string;
generate, using the unsupervised natural language processing model, a token graph comprising the nodes and weighted edges between the nodes, wherein the weighted edges represent how often strings represented by two connected nodes co-occur in a window of contiguous strings of the unlabeled data within a fixed-length text window;
determine, using the unsupervised natural language processing model, a first weighted edge connecting the first node and the second node,
wherein the first weighted edge is based on a first co-occurrence of the first string with the second string or one or more third strings within the fixed-length text window;
determine that a first importance value based on the first weighted edge is greater than a second importance value based on a second weighted edge connecting the first node to a third node of the nodes;
generate, based on determining that the first importance value is greater than the second importance value, a widget comprising images of the first product and at least one additional tending product at the online retail system, and further comprising an indication that the first string is a basis for why the first product and the at least one additional are trending; and
cause to present, through a user interface, the widget.

14. The system of claim 13, wherein the first importance value is further based on a number of other strings with which the first string has a co-occurrence within the fixed-length text window and a number of co-occurrences with the other strings.

15. The method of claim 5, wherein extracting the unlabeled data occurs without training data provided to the unsupervised natural language processing model.

16. The system of claim 13, wherein the one or more processors are further configured to execute the computer-executable instructions to:
determine that the first product is a first type of product, wherein the indication that the first string is a basis for why the first product and the at least one additional product are trending is that the first product is the first type of product.

17. The system of claim 13, wherein the one or more processors are further configured to:
determine a first trending score associated with the first product based on click-through-rate (CTR) data and conversion-rate (CVR) data associated with the first product; and
generate the first node based on the CTR data and the CVR data.

18. The system of claim 13, wherein the first string includes at least a portion of a product title associated with the first product.

19. The system of claim 13, wherein the first input data includes at least one of: a search query associated with the first product and a product title.

20. The system of claim 13, wherein to extract the unlabeled data occurs without training data provided to the unsupervised natural language processing model.

* * * * *